United States Patent [19]

Ponjee et al.

[11] Patent Number: 4,902,104

[45] Date of Patent: Feb. 20, 1990

[54] DISPLAY CELL WITH ALKYL MERCAPTAN ALIGNMENT LAYER

[75] Inventors: Johannes J. Ponjee; Antonius B. Voermans, both of Eindhoven, Netherlands

[73] Assignee: U.S. Philips Corp., New York, N.Y.

[21] Appl. No.: 223,468

[22] Filed: Jul. 22, 1988

[30] Foreign Application Priority Data

Jul. 23, 1987 [NL] Netherlands .................. 8701737

[51] Int. Cl.$^4$ ............................................. G02F 1/13
[52] U.S. Cl. ..................................... 350/340; 350/341
[58] Field of Search .................. 350/340, 339 R, 341, 350/350 R; 252/299.4

[56] References Cited

U.S. PATENT DOCUMENTS

| 3,973,057 | 8/1976 | Channin et al. ............. 350/340 X |
| 4,437,731 | 3/1984 | Sudo et al. ..................... 350/340 |
| 4,464,282 | 8/1984 | Harrison et al. ......... 350/350 R X |
| 4,496,221 | 1/1985 | Harrison et al. ................ 350/349 |
| 4,674,842 | 6/1987 | Van De Venne ............... 350/340 |
| 4,776,674 | 10/1988 | Filas et al. ..................... 350/340 |
| 4,796,979 | 1/1989 | Tsuboyama .................... 350/341 |
| 4,820,026 | 4/1989 | Okada et al. .................... 350/341 |

FOREIGN PATENT DOCUMENTS

| 0035120 | 4/1981 | Japan ............................ 350/341 |
| 8802874 | 4/1988 | PCT Int'l Appl. ............... 350/340 |

OTHER PUBLICATIONS

"Thin Film Surface Orientation for Liquid Crystals", John L. Janning, Journal of Applied Physics, vol. 21, No. 4, 1972.

"The Temperature Dependence of Liquid Crystal Tilt Angles", Sprang and Aartsen, J. Appl. Phys. 56(2). 15, Jul. 1984.

Primary Examiner—Stanley D. Miller
Assistant Examiner—Napoleon Thantu
Attorney, Agent, or Firm—Ernestine C. Bartlett

[57] ABSTRACT

A display cell having two parallel transparent substrate plates which are interconnected at their periphery and which are each provided with an electrode and an orientation layer, and comprising a liquid crystalline compound in the cell space between the plates, the orientation layer being a monolayer of an alkyl mercaptan.

7 Claims, 1 Drawing Sheet

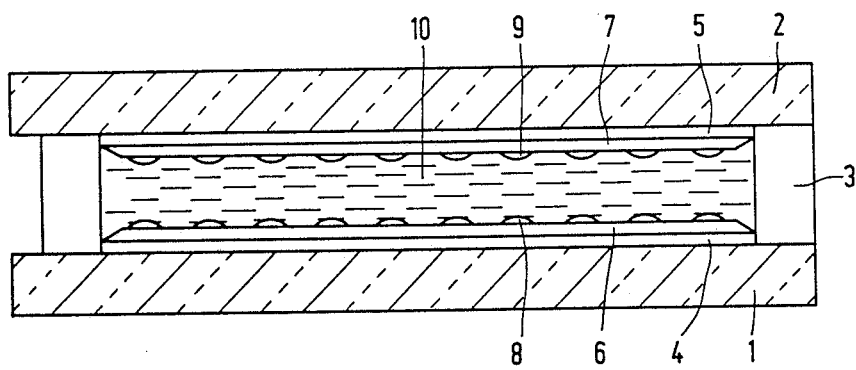

DISPLAY CELL WITH ALKYL MERCAPTAN ALIGNMENT LAYER

FIELD OF THE INVENTION

The invention relates to a display cell comprising two parallel, closely spaced transparent substrate plates which are interconnected at the periphery by means of a seal, the plates being provided with an electrode at the facing surfaces and with an orientation layer which is applied to the electrode and which imposes a homeotropic or tilted orientation on a liquid crystalline compound which is provided in the space bounded by the plates and the seal.

BACKGROUND OF THE INVENTION

Various types of liquid crystalline displays (display cells) require a homeotropic orientation of the liquid crystalline (LC) compound relative to the substrate plate carrying the electrode. In the case of a homeotropic orientation the molecules of the LC compound have a preferred direction which is perpendicular to the surface of the substrate plate. A homeotropic orientation is necessary, inter alia, for LC displays having dynamic scattering, ECB (electrically controlled birefringence) and cholesteric-nematic phase transitions. In European Patent Application No. 0173.369 which corresponds substantially to U.S. Pat. No. 4,674,842 which issued June 23, 1987 to the Applicants herein, it is described that an orientation layer of certain silane compounds brings about a homeotropic orientation.

An object in accordance with the invention is to provide a display cell the orientation layer of which has a multilayer structure which brings about a tilted orientation of the LC compounds.

For a proper understanding it is to be noted that an orientation layer does not have to be oriented itself. Such a layer imposes (induces) an orientation on molecules of a liquid crystalline compound.

In the case of a tilted orientation, the molecules of the LC compound are oriented at an orientation angle (tilt angle) to the surface of the orientation layer. The orientation angle is calculated relative to the surface of the orientation layer. A tilt angle of, in particular, 15°–30° is of substantial importance for the so-called STN displays (supertwist nematic) in which the liquid crystalline cell medium has a twisted configuration of 180°–360°. Twist is to be understood to mean herein the rotation of the direction (director) of the longitudinal axis of the molecules of the LC compound across the cell thickness. An interesting display having a twist of 270° is known as supertwist birefringence effect cell (SBE). It is known from, for example, J. Appl. Phys. 56 (2), 15 July 1984, pp. 251–262, that in order to obtain a tilted orientation, an orientation layer of SiO is applied by means of vapor deposition at an angle of 80°–86° relative to the normal to the substrate surface. In other words, an oblique vapour deposition is effected. This process is very laborious and has the disadvantage that the process parameters are difficult to control. Since, the tilt angle depends upon the vapor-deposition conditions, a precise and uniform adjustment of the tilt angle has not heretofore been possible.

The display cell in accordance with the invention does not have this disadvantage. In particular, a further object of the invention is the provision of the possibility of precisely and uniformly adjusting any desired tilt angle.

SUMMARY OF THE INVENTION

The objects mentioned hereinbefore are achieved in accordance with the invention by means of a display cell comprising two parallel closely spaced transparent substrate plates which are interconnected at the periphery by means of a seal, the plates being provided with an electrode at the facing surfaces and with an orientation layer which is applied to the electrode and which imposes a homeotropic or tilted orientation on a liquid crystalline compound which is provided in the space bounded by the plates and the seal, which is characterized in that the orientation layer is a monolayer of an alkylmercaptan.

The monolayer imposes a homeotropic orientation on the LC molecules. The quality of the orientation (the directional force) is enhanced when the length of the alkyl group increases. Preferably, an alkyl mercaptan is used the alkyl group of which contains at least 12 carbon atoms, in particular of from 12–20 carbon atoms. A suitable orientation layer contains a monolayer of octadecylmercaptan.

The orientation layer is bonded to the surface of the electrode via the mercaptan group. The long-chain alkyl group of the mercaptan compound extends perpendicularly to the surface of the electrode.

In a preferred embodiment of the display cell in accordance with the invention, an orientation layer is used which contains a metal layer and a monolayer of alkyl mercaptan provided thereon.

The mercaptan compound bonds very well to a metal surface. A metal layer which is preferably used is a layer of Ag or Au. By means of an electroless process such as a vapor deposition process or a sputtering process, the metal layer is provided in a very thin layer having a thickness in the nanometer range.

In an especially preferred embodiment of the display cell in accordance with the invention, an orientation layer is used which has a multilayer structure and which, starting from the electrode, consists of a layer of $SiO_x$, wherein $x=1-2$, a discontinuous metal layer and a monolayer of an alkyl mercaptan provided on the metal layer.

By means of said especially preferred embodiment, a tilted orientation with an adjustable tilt angle can be obtained. As is customary, the electrode used is transparent and is made of, for example, tin oxide or ITO (indium-tin-oxide). A layer of $SiO_x$ such as a layer of SiO is provided on the electrode by means of vapour deposition. The layer thickness is small and amounts to, for example, 10–30 nm. The obtained $SiO_x$ layer itself brings about an orientation of the LC compounds which is parallel to the surface. A discontinuous metal layer is provided on the $SiO_x$ surface. A suitable metal layer is, in particular, a layer of Ag or Au. The metal layer is deposited by means of an electroless process, in particular, a vapor deposition process or sputtering process. Vapor deposition or sputtering is carried out such that not the entire surface of the $SiO_x$ layer is covered with the metal layer. Such a discontinuous, interrupted, metal layer can for example be applied by using a mask which is provided with apertures and which covers parts of the surface of the $SiO_x$ layer. A suitable choice of the mask permits the metal layer to be provided in any desired pattern.

Preferably, the discontinuous metal layer is a vapor-deposited layer in the insular stage which is evenly distributed and which has a thickness of no more than, approximately, 10 nm.

Such a discontinuous metal layer can simply be obtained by stopping the vapor deposition process before the surface to be metallized is covered with a continuous layer. In this initial stage of the vapor deposition process the metal layer has an insular structure of separate areas which are not connected to one another.

In a further preferred embodiment, the metal layer is an Ag layer or an Au layer.

The discontinuous metal layer is provided with the above-said monolayer of alkyl mercaptan. To this end, the substrate containing the discontinuous metal layer is treated with a solution of the mercaptan in a suitable organic solvent such as an aromatic or aliphatic hydrocarbon, for example hexane. The treatment can be carried out by immersing the substrate in the mercaptan solution and removing the excess by rinsing. This solution may alternatively be provided on the substrate (with the metal layer) by mist spraying, spraying, pouring, etc.

The tilt angle of the liquid crystalline compound obtained depends on and is determined by the ratio between the surface of the discontinuous metal layer and the surface of the $SiO_x$ layer which is not covered with metal. If this ratio is high, a large tilt angle is obtained. The size of the tilt angle increases as the coverage of the $SiO_x$ layer with metal areas increases. If the $SiO_x$ layer is sparsely covered with metal, the tilt angle is small and is close to 0° so that the orientation is substantially planar. As soon as the $SiO_x$ layer is substantially completely covered with metal a maximum tilt angle of almost 90° is obtained and, hence, the orientation is substantially homeotropic. The length of the alkyl chain of the alkyl mercaptan and the type of liquid crystalline compound also influence the tilt angle.

BRIEF DESCRIPTION OF THE DRAWING

The invention will now be explained in more detail by means of the drawing in which the FIGURE is a cross-sectional view of a display cell in accordance with the invention.

DETAILED DESCRIPTION OF THE PREFERRED EMBODIMENTS

In the drawing, the reference numerals 1 and 2 denote two parallel substrate plates which are made of glass and which are located at some distance from one another. The plates are interconnected at the periphery by a seal 3 which is made of, for example, an elastomer. At the facing surfaces, the plates 1 and 2 are each provided with a transparent electrode 4, 5, respectively, which is made of, for example, indium-tin-oxide. The electrodes are provided with a layer 6, 7, respectively, of SiO which is provided by means of vapor deposition at an angle of 40° to the normal to the substrate surface. The layer thickness is 20 nm. An SiO layer which is provided by means of vapor deposition at an angle of from 30°-70° to the normal brings about a planar orientation of liquid crystalline compounds. A gold film having a thickness of 0.5 nm is provided by means of vapor deposition on the SiO layer 6, 7, respectively. The gold film of this thickness is in the so-called insular stage, in which separate areas 8, 9, respectively, of gold are deposited on the underlying SiO surface. The areas 8, 9, respectively, are provided with a monolayer of octadecylmercaptan which is not shown. To this end, the substrate plates 1 and 2 are immersed in a 0.7% solution of octadecylmercaptan in hexane for 3 minutes, after which they are rinsed in pure hexane.

A liquid crystalline compound 10 is present in the cell space surrounded by the substrate plates 1, 2 and the seal 3. The tilt angle of the liquid crystalline compound is measured magnetically and amounts to 55°.

What is claimed is:

1. A display cell comprising two parallel, closely spaced transparent substrate plates which are interconnected at the periphery by means of a seal, the plates being provided with an electrode at the facing surfaces and with an orientation layer which is applied to the electrode and which imposes a homeotropic or tilted orientation on a liquid crystalline compound which is provided in the space bounded by the plates and the seal, wherein the orientation layer is a monolayer of an alkyl mercaptan.

2. A display cell comprising two parallel, closely spaced transparent substrate plates which are interconected at the periphery by means of a seal, the plates being provided with an electrode at the facing surfaces and with an orientation layer which is applied to the electrode and which imposes a homeotropic or tilted orientation on a liquid crystalline compound which is provided in the space bounded by the plates and the seal, wherein the orientation layer contains a metal layer and a monolayer of alkyl mercaptan provided thereon.

3. A display cell as claimed in claim 2, wherein the orientation layer has a multilayer structure and, starting from the electrode, consists of a layer of $SiO_x$, wherein $x=1$ or 2, a discontinuous metal layer and a monolayer of an alkyl mercaptan provided on the metal layer.

4. A display cell as claimed in claim 3, wherein the discontinuous metal layer is a vapor-deposited layer in the insular stage with a thickness up to 10 nm.

5. A display cell as claimed in claim 2, 3 or 4, wherein the metal layer is an Ag layer or Au layer.

6. A display cell as claimed in claim 1, wherein said orientation layer comprises a monolayer of octadecylmercaptan.

7. A display cell as claimed in claim 2 wherein said orientation layer comprises a monolayer of octadecylmercaptan.

* * * * *